US012780536B2

(12) United States Patent
Codina Relats et al.

(10) Patent No.: US 12,780,536 B2
(45) Date of Patent: Nov. 3, 2026

(54) DEAD LIVESTOCK COLLECTION SYSTEM

(71) Applicants: SUBPRODUCTOS CARNICOS ECHEVARRIA Y ASOCIADOS, SL, Barcelona (ES); SUSTAINCO INVEST, SLU, Tarrega (ES)

(72) Inventors: David Codina Relats, Barcelona (ES); Ramon Roca Enrich, Agramunt (ES)

( * ) Notice: Subject to any disclaimer, the term of this patent is extended or adjusted under 35 U.S.C. 154(b) by 383 days.

(21) Appl. No.: 18/526,585

(22) Filed: Dec. 1, 2023

(65) Prior Publication Data

US 2024/0182240 A1 Jun. 6, 2024

(30) Foreign Application Priority Data

Dec. 2, 2022 (EP) .................................... 22383177

(51) Int. Cl.
*B65F 3/02* (2006.01)
*B60P 3/20* (2006.01)

(52) U.S. Cl.
CPC .................. *B65F 3/02* (2013.01); *B60P 3/20* (2013.01); *B65F 2003/023* (2013.01); *B65F 2240/121* (2013.01)

(58) Field of Classification Search
CPC ........ B65F 3/02; B65F 3/26; B65F 2003/023; B65F 2240/121; B60P 3/20; A01K 29/00; A01K 45/00
See application file for complete search history.

(56) References Cited

U.S. PATENT DOCUMENTS 5,148,739 A * 9/1992 Fox ....................... B65F 1/0093 100/92
6,470,949 B1 * 10/2002 Iglesias Ballester ....................... F25D 23/021 49/63
10,207,866 B1 * 2/2019 Dunbar .................. G01F 17/00
(Continued)

FOREIGN PATENT DOCUMENTS

| | | |
|---|---|---|
| CN | 208790401 U | 4/2019 |
| CN | 111003432 A | 4/2020 |
| CN | 217227377 U | 8/2022 |

OTHER PUBLICATIONS

Spain's Ministry of Agriculture and Food and Environment, "Removal guide of dead animals on farm", Oct. 2014.

*Primary Examiner* — Glenn F Myers
(74) *Attorney, Agent, or Firm* — Eugenio J. Torres-Oyola; Victor M. Rodriguez-Reyes; Rafael Rodriguez-Muriel

(57) ABSTRACT

The present invention discloses a dead livestock collection system comprising: a container located at a collection site close to a delimiting perimeter of a farm; a collection vehicle having a collection box with a top opening; a loading mechanism of the collection vehicle for grasping the container, lift and tip it to unload the dead livestock into the collection box; wherein the collection site has an inner access side, through which the container is accessible from inside or through the delimiting perimeter, and an opposite outer access side through which the container is accessible to the collection vehicle from outside the delimiting perim-
(Continued)

eter; the system further comprising: a refrigeration chamber for refrigerating the container and provided with a door; a door actuation unit of said door; and a translation unit for moving the container from the refrigeration chamber to the collection site and vice versa while said door is open.

15 Claims, 12 Drawing Sheets

(56) References Cited

U.S. PATENT DOCUMENTS

| | | | | |
|---|---|---|---|---|
| 11,148,880 | B1 * | 10/2021 | Koga | B60R 25/01 |
| 2012/0273498 | A1 * | 11/2012 | Curotto | B65F 1/122 220/495.06 |

* cited by examiner

DEAD LIVESTOCK COLLECTION SYSTEM

TECHNICAL FIELD

The present invention generally relates to a device for the collection of dead farm animals, and more particularly a device for the temporary storage, collection, transport and unloading of dead animals from livestock farms.

The device has application in the field of animal husbandry on farms, such as pig, sheep, goat, poultry and rabbit farming, among others.

BACKGROUND OF THE INVENTION

For the collection of dead livestock, i.e. farm animals, it is common to have a container with a lid located at a collection site close to a delimiting perimeter of the farm and into which the farmer deposits the dead livestock, and a collection vehicle with a collection box with a top loading opening and a loading mechanism configured to grasp the container at the collection site, lift and tip the container to unload the dead livestock into the collection box through the top loading opening, and return the container to the collection site. It is also known to have cooling means configured to maintain the container at or below 8 degrees Celsius.

According to this conventional system, the farmer notifies a collection control station in charge of scheduling the collection routes of the collection vehicle when he considers that the container is full or that a maximum recommended time has elapsed since the first dead animal was deposited. However, due to errors of judgement of the farmer, there is a risk that the collection takes place too late, when the dead animals have started to decay inside the container and gases, including bad smells, and/or liquids resulting from the decomposition of the dead animals have started to be released into the environment, which can lead to a health hazard.

On the other hand, it is common for the driver of the collection vehicle to get out of the vehicle to attach the loading mechanism to the container and to command the unloading operations and return of the container to the collection site. In doing so, the driver, after having stepped on the ground in and around the collection site, gets back into the vehicle and may go to another farm for another collection service, which implies getting out of the vehicle again and stepping on the ground next to the container with the risk of spreading possible contamination from one farm to another.

CN214525408U discloses a mobile dead farm animal collection container, comprising a heat-insulated box with an inner tray. The insulated box is closed by sliding doors on opposite sides thereof and is equipped with an internal cooling machine and an external cooling machine.

US2005034286A1 discloses a container for the storage and transport of dead livestock and organic waste comprising a hermetically sealed convex top lid in which a rotating body is formed to allow access to organic waste inside without the need to open the top lid of the container. A nitrogen tank is externally mounted on one wall of the container, which, by means of a set of pipes and valves in cooperation with a control circuit, is arranged to introduce nitrogen into the container and create an inert atmosphere therein.

EP1008822 discloses a container for the storage and refrigeration of carcasses of small farm animals. The container comprises a carcass collection tray with thermally insulated walls on which a lid is fitted with a refrigeration unit for cooling the products stored in the tray. The lid is removable and by means of a mechanism can be lifted or removed to allow access to the tray.

CN112460890A discloses a collection container for a device for storing animal carcasses in a refrigerated building. The container has no lid and, once loaded, is moved to a shelf in the refrigerated building by means of suitable equipment such as a stacker. For unloading, the container is removed from the refrigerated building and moved to an unloading location where the carcass of the dead animal is discharged from the container through a hinged wall by means of a pusher installed inside the container.

CN207984675U discloses an automated vehicle for the safe collection of dead animals comprising a collection vehicle having a driver's cab, a refrigerated and tilting transport box, and a robotic arm. The transport box has a top opening with an automatically operated horizontal sliding door and automatically operated rear doors for unloading. The robotic arm is configured to grasp an animal carcass deposited on the ground and load it into the transport box through the top loading opening. In a space between the driver's cab and the transport box there is a reservoir of disinfectant liquid connected by a tube to a spray nozzle installed at the end of the robotic arm, which allows, once the carcass has been loaded into the transport box, to disinfect the floor where the carcass had been deposited.

CN213111583U discloses a collection and transfer system for the transport of dead farm animals comprising a collection truck, a refrigeration chamber, a container, and a transfer truck. The upper part of the refrigeration chamber has a discharge opening with a lid. The top of the container is provided with a feed port with a horizontal sliding lid, and the container is positioned inside the refrigeration chamber so that the feed port corresponds to the position of the discharge opening. The collection truck is used to unload the dead farm animals into the container through the discharge opening and the feed port. The transfer truck, which has a container platform and a hook arm, is used to extract the container through a side door of the refrigeration chamber and load it onto the platform.

CN212023603U discloses an animal carcass storage tank and a special refrigerated vehicle for transporting the storage tank. The storage tank includes a body with a base, a top loading opening with a sliding cover operated by a first pneumatic cylinder, and a final discharge opening with a tilting cover operated by a second pneumatic cylinder. The animal carcasses are loaded into the tank through the top loading opening and discharged through the final discharge opening. The tank is hermetically sealed after the covers have been closed. The refrigerated vehicle has a driver's cab and a refrigerated transport box fitted with a rear hinged door which forms a ramp when open. Inside the transport box a storage tank gripping device is installed which includes an automatic telescopic bar with a gripper at its end configured to grip the tank. On the roof of the transport box there are spray nozzles for spraying disinfectant liquid.

CN212018896U discloses an automatic system for the collection and transfer of farm animal carcasses with biosafety prevention and control. The system includes a collection trolley that picks up animal carcasses from the farm pens and brings them to a length and weight measuring device. From there, a first transport device drives the carcasses through an infrared counting device and a carcass cleaning and disinfection facility to an unloading room. From the unloading room the carcasses are fed into a storage tank. The storage tank, once closed, is driven by a second transport device through a cleaning and disinfection facility of the outer surface of the tank and loaded onto a refrigerated transfer vehicle which takes it to a cleaning and disinfection facility of a processing centre.

CN111589838A discloses a biological prevention and control system for the collection and treatment of farm animal carcasses, which includes a carcass collection device that collects animal carcasses at a collection site, a carcass transport device that is used to transport animal carcasses to a carcass storage device, and from there the carcasses are conveyed to an animal carcass processing device that is used to perform a high-temperature refining treatment of the carcasses. The system includes refrigerated animal carcass collection and transport vehicles, carcass cleaning and disinfection facilities, and refrigerated tanks.

CN203567607U discloses a carcass transport vehicle comprising a driver's cab, a refrigerated transport box comprising a refrigeration apparatus and a refrigeration compartment having a movable double-leaf door. The refrigeration compartment is provided with an isolation screen which is used to separate a refrigerated area and a slaughter control area which has a killing device and a hermetically sealed door. The refrigeration compartment has on both sides a spray pipe provided with a plurality of sprinklers covering the entire refrigerated area.

The document "GUIA DE RETIRADA DE ANIMALES MUERTOS EN EXPLOTACIÓN" issued by the Spanish Ministry of Agriculture, Food and Environment in October 2014 and published at <https://www.mapa.gob.es/es/ganaderia/temas/sanidad-animal-higiene-ganadera/guiarecogidacadaveresvr3oct_tcm30-560982.pdf> discloses, in the last paragraph of page 9, a variant that perfects the collection system established in section 4(b) of the same document regarding containers, and which should be promoted on farms that opt for a more spaced collection over time. This variant consists of placing the container, closed by means of a watertight lid, inside a pit or underground watertight space refrigerated by means of a cooling device capable of maintaining a temperature of 8 degrees Celsius inside the container, which considerably improves the visual and environmental impact (e.g. odours or other gases and/or liquids).

DESCRIPTION OF THE INVENTION

The present invention, in relation to the described state of the art, represents a technical alternative for the implementation of collection systems, which improves the sanitary safety of the whole collection and transport operation and offers different variants for different farm scenarios.

In particular, the present invention discloses a dead livestock collection system comprising: a dead livestock container located at a collection site close to a delimiting perimeter of a farm; configured for receiving dead livestock loaded by a farmer;

- a refrigeration unit arranged to maintain the container refrigerated;
- a collection vehicle having a driver cab and a collection box provided with a top load opening;
- a loading mechanism mounted to the collection vehicle and configured to grasp the container at the collection site, lift and tip the container to unload the dead livestock into the collection box of the vehicle through the top load opening, and to return the container to the collection site;
- wherein the collection site has an inner access side, through which the container at the collection site is accessible to the farmer from inside the delimiting perimeter or through the delimiting perimeter of the farm, and an opposite outer access side through which the container at the collection site is accessible to the collection vehicle from outside the delimiting perimeter of the farm;

and wherein the system further comprises:

- a refrigeration chamber dimensioned to enclose the container and provided with a door next to the collection site;
- a door actuation unit of the refrigeration chamber arranged to open and close its door;
- the refrigeration unit is arranged to maintain the refrigeration chamber at or below a predetermined temperature while its door is closed; and
- a container translation unit configured to move the container from the refrigeration chamber to the collection site and from the collection site to the refrigeration chamber while the door is open.

According to the present invention, the collection site may be next to the delimiting perimeter of the farm.

According to the present invention, the dead livestock container may be a front lift container.

According to the present invention, the refrigeration unit may be arranged to maintain the refrigeration chamber at a temperature of 10 degrees Celsius or below, preferably 8 degrees Celsius or below, and even more preferably 5 degrees Celsius or below. However, the aforementioned temperatures are only exemplary values and the refrigeration unit can be configured to maintain a different temperature, said temperature being higher or lower than the previously mentioned examples.

According to the present invention, the door of the refrigeration chamber may be a side door, i.e. may be located at one of the lateral sides thereof. Alternatively, the door of the refrigeration chamber may be located at the upper or lower panels or surfaces thereof.

According to the present invention, the system may further comprise at least one indoor signal transmitter arranged to be operated from inside the delimiting perimeter of the farm and at least one outdoor signal transmitter arranged to be operated from inside the driver cab of the collection vehicle, the indoor signal transmitter and the outdoor signal transmitter being configured to emit wireless signals for activating the door operating means and the container translation unit.

According to the present invention, the loading mechanism of the collection vehicle may comprise a front lifting arm, and the container may be adapted to be handled with said front lifting arm.

According to the present invention, the collection box of the collection vehicle may have a container disinfection device configured to spray a disinfectant liquid inside the container while the container is held by the front lifting arm in a tipping position after it has been unloaded into the collection box of the collection vehicle and before it is returned to the collection site.

According to the present invention, the container may have foldable wall extensions arranged on top edges of opposite side walls thereof, the foldable wall extensions being hinged about an axis at an end of the top edges of the opposite side walls of the container to move between a folded position and an unfolded position, said foldable wall extensions being configured to cover, in the unfolded position, lateral spaces between the top edges of the side walls of the container and side edges of the top loading opening of the collection box of the collection vehicle when the container is held by the front lifting arm in a tipped position.

Said foldable wall extensions, among other benefits, prevent spillage of the dead livestock or liquid resulting from its decay outside the collection box, as said foldable wall extensions aids in conducting the content of the container to the top loading opening of the collection box.

According to the present invention, the container may have a spring device configured to drive the foldable wall extensions to the unfolded position and a retaining mechanism configured to retain the foldable wall extensions in the folded position, said retaining mechanism being configured to cooperate with the front lifting arm of the collection vehicle to release the retention of the foldable wall extensions when the front lift arm grips the container.

According to the present invention, the system may further comprise a motorised folding mechanism mounted on the container or on container the translation unit, said motorised folding mechanism being configured to fold the folding wall extensions against a force exerted by the spring device until the folding wall extensions are retained in the folded position by the retaining mechanism.

According to the present invention, the container may be a lidless container. However, the container may also have a lid with an open and with a closed position, whereby in the closed position the container is preferably hermetically sealed and in the open position dead livestock can enter or leave the container.

According to the present invention, the collection vehicle may comprise a loading control located within the driver's cab, said loading control being configured to control the loading mechanism of the collection vehicle.

According to the present invention, the top loading opening of the collection box of the collection vehicle may have a top door and a top door actuator arranged to move the top door between an open position and a closed position, and the loading control may be configured to activate the top door actuator in coordination with the loading mechanism.

According to the present invention, said top door may be a sliding door. However, said top door can also be a swing door, i.e. hinged, or a door of any other suitable kind. If the top door is of the sliding type, it is preferably horizontal.

According to the present invention, the top door may have one or more leaves.

According to the present invention, the collection box of the collection vehicle may have a protruding front portion extending over a part of the driver's cab, and the top loading opening may span a front part of the collection box including the protruding front portion, i.e. at least part of the top loading opening may be placed on the protruding front portion.

According to the present invention, the collection vehicle may comprise wheels, said wheels having wheel treads, and a wheel disinfection device configured to spray a disinfectant liquid on the wheel treads while the collection vehicle starts moving after the container has been returned to the collection site. Alternatively, the collection vehicle may comprise tracks, said tracks having tracks treads, and a track disinfection device configured to spray a disinfectant liquid on the track treads while the collection vehicle starts moving after the container has been returned to the collection site.

According to the present invention, the refrigeration chamber may be equipped with a plurality of sensors and the system may further comprise a computing device configured to determine, in cooperation with the plurality of sensors, when the content of the container needs to be collected.

According to the present invention, the system may further comprise a signal emitter connected to the computing device and configured to automatically send a collection message to a collection control station in charge of programming collection routes of the collection vehicle when the computing device has determined a collection need. Preferably, the signal emitter is a radio signal emitter and the computer device is configured to automatically send a radio collection message to a collection station configured to receive such kind of message.

According to the present invention, the container translation unit may comprise guide elements arranged between the interior of the refrigeration chamber and the collection site, a support platform configured to support the container, and a translation actuator configured to move the support platform along the guide elements.

According to the present invention, the collection box of the collection vehicle is configured to tilt and has a rear discharge door hinged to a horizontal axis.

In the present document livestock designates cattle, swine, sheep, goats, poultry, horses, rabbit, etc.

It will be understood that references to geometric position, such as parallel, perpendicular, tangent, etc. allow deviations up to ±5° from the theoretical position defined by this nomenclature.

It will also be understood that any range of values given may not be optimal in extreme values and may require adaptations of the invention to these extreme values are applicable, such adaptations being within reach of a skilled person.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which.

DETAILED DESCRIPTION OF THE INVENTION AND OF PARTICULAR EMBODIMENTS

The foregoing and other advantages and features will be more fully understood from the following detailed description of an embodiment with reference to the accompanying drawings, to be taken in an illustrative and not limitative way.

Figure 1:
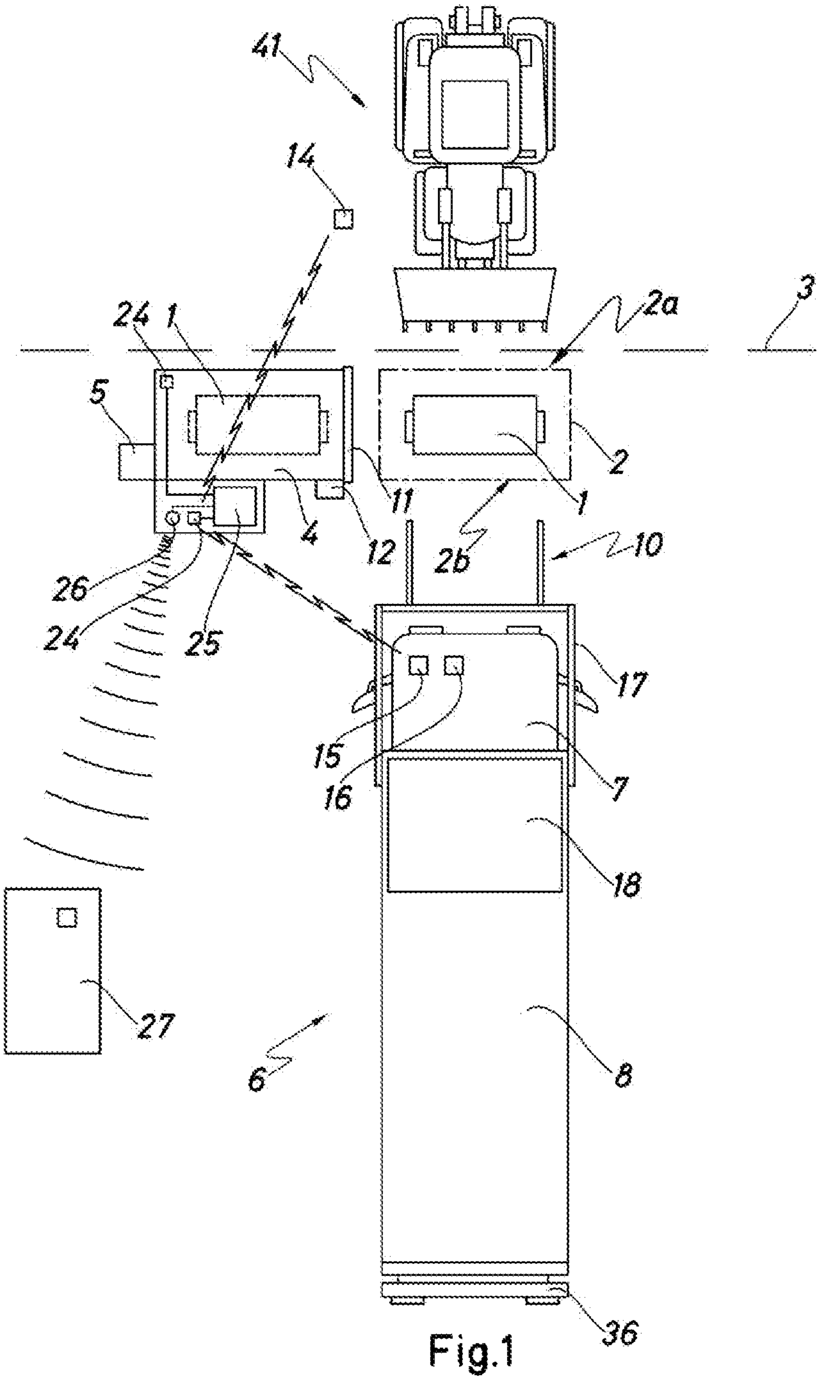
FIG. 1 shows a top schematic view of a first exemplary embodiment of a dead livestock collection system according to the present invention.

A top schematic view of a first exemplary embodiment of a dead livestock collection system according to the present invention can be seen in FIG. 1. The collection system of this first exemplary embodiment comprises a dead livestock container 1, hereinafter simply container 1, located at a collection site 2 close to a delimiting perimeter 3 of a farm (not shown), said container 1 being configured to receive dead livestock loaded by a farmer or any other suitable designated person.

The system of this exemplary embodiment further comprises a collection vehicle 6 that comprises a driver cab 7, a collection box 8 and a loading mechanism 10 configured to grasp the container 1, lift and tip, i.e. tilt, the container 1 to unload the dead livestock contained in the container 1 into the collection box 8 of the vehicle 6 through a top load opening 9 and to return the container 1 to its resting position. In this exemplary embodiment, the collection vehicle 6 comprises a top door 18 that is movable between an open position which allows access to the top load opening 9 and the inside of the collection box 8, and a closed position wherein the top load opening 9 is closed, and therefore, livestock cannot be entered to the collection box 8. The container 1 is preferably grasped and returned to the collection site 2.

As will be explained in more detail hereinbelow, the loading mechanism 10 of the collection vehicle 6 can comprise a front lifting arm 17.

The system of the exemplary embodiment shown further comprises a refrigeration chamber 4 dimensioned to enclose the container 1 and equipped with a refrigeration unit 5 configured to maintain the container refrigerated below a predetermined temperature. Said temperature is preferably 10 degrees Celsius, more preferably 8 degrees Celsius and even more preferably 8 degrees Celsius.

In the exemplary embodiment shown, the collection site 2 is located next to the delimiting perimeter 3 of the farm. However, in other embodiments simply being close to the delimiting perimeter 3 would suffice.

The system of this first exemplary embodiment comprises container translation unit 13 (see FIGS. 2 and 3) configured to move the container from the refrigeration chamber 4 to the collection site 2 and from the collection site 2 to the refrigeration chamber 4 while a door 11 of the refrigeration chamber 4 is open. In order to do so, the system further comprises a door actuation unit 12 arranged to open and close said door 11 of the refrigeration chamber 4. Said door 11 is preferably a side door, i.e. is located at one of the lateral faces of the refrigeration chamber 4.

The collection site 2 shown has an inner access side 2*a* and an outer access side 2*b*. The container 1 at the collection site 2 is accessible to the farmer from inside the delimiting perimeter 3 through the inner access side 2*a*. The container 1 is accessible to the collection vehicle 6 from outside the delimiting perimeter 3 of the farm through the outer access side 2*b*.

In the exemplary embodiment shown, the collection vehicle 6 comprises a loading control 16 within the driver's cab 7, said loading control 16 being configured to control the loading mechanism 10 of the collection vehicle 6. As the loading control 16 is located within the cab 7, the driver does not need to step out of the collection vehicle 6, thus avoiding the risk of contamination that could occur when standing close to the farm, and in particular, close to the collection site 2. Therefore, the worker health and safety is increased. Moreover, this also reduces the risk of spreading virus, contamination, etc. from one farm to another, which is also very desirable.

In the exemplary embodiment shown in FIG. 1, the system further comprises a indoor signal transmitter 14 arranged to be operated from inside the delimiting perimeter 3 of the farm and an outdoor signal transmitter 15 arranged to be operated from inside the driver's cab 7 of the collection vehicle 6, the indoor signal transmitter 14 and the outdoor signal transmitter 15 being configured to emit wireless signals for activating the door operating means 12 and the container translation unit 13. The outdoor signal transmitter 15 allows the driver to move the container 1 to the collection site 2, and vice versa, without needing to leave the cabin of the vehicle, with the advantages previously described associated to this effect. Similarly the indoor signal transmitter 14 allow the farmer or any other designated person to wirelessly move the container 1 to the collection site 2, and vice versa, thus avoiding the risk of contamination associated with touching elements which have been in close relationship with dead livestock.

The refrigeration chamber 4 of the system of the exemplary embodiment shown in FIG. 1 comprises one or more sensors 24 that together with a computing device 25, determine when the content of the container 1 needs to be collected. Said sensors may be, for example, an ultrasound sensor for detecting the volume of dead livestock within the container, a gas detector for detecting certain gases caused by the decay of the carcasses, a camera that allows visual inspection, by a human or an artificial intelligence, of the visual aspect of the livestock, a timer activated the first time a carcass is placed inside the container, etc.

Once the computing device 25, based on the information provided by the one or more sensors 24, determines that the container 1, and in particular, its content, should be collected, it may alert the farmer to arrange for collection. Moreover, in embodiments such as the one shown in FIG. 1 which further comprise a signal emitter 26 connected to the computing device 25, which is configured to automatically send a collection message to a collection control station 27, the farmer may not need to do anything as the system itself arranges for the collection of the container 1 when it determines that it is time to do so. Said signal emitter 26 is preferably a radio signal emitter 26 as radio provides a long signal range. The control station 27 is in charge of programming collection routes of the collection vehicles when the computing device 25 has determined a collection need. Said control station 27 can be humanly operated on can also be automated.

Dead livestock or carcasses can be placed inside the container 1 at the collection site 2 with the aid of a carcass transport device 41. Depending on the size and weight of the livestock to be treated, said carcass transport device 41 can be, for example a bulldozer, a crane, etc. If the regulations, and size and weight of the livestock, so allow, dead livestock can also be loaded into the container 1 manually, although this situation should be avoided as it increases the risk of contamination of the farmer or designated person manually loading the dead livestock.

In this exemplary embodiment the collection box 8 of the collection vehicle 6 is configured to tilt and comprises a rear discharge door 36 hinged to an axis 37 (see FIG. 6) that allows for an easy discharge of the dead livestock once the collection vehicle 6 arrives at the processing facility.

The collection box 8 of the collection vehicle 6 can also be refrigerated, so that the temperature of the dead livestock is kept below a predetermined threshold and its decay is slower. However, as the collection vehicle 6 does not typically store the dead livestock in the collection box 8 for a long period of time, it is not necessary that all collection vehicles 6 have a refrigerated collection box 8, although in certain circumstances can be advantageous.

Although the exemplary embodiment depicted in FIG. 1 only comprises one refrigeration chamber 4 which is configured to house and refrigerate one container 1, other embodiments of the present invention could comprise more than one refrigeration chamber 4, each one being configured to house and refrigerate a corresponding container 1. In other embodiments, it is also possible that a single refrigeration chamber 4 is configured to house and refrigerate more than one container 1. In case of multiple refrigeration chambers 4, each chamber 4 can have its own refrigeration unit 5 or a single refrigeration unit 5 can refrigerate two or more refrigeration chambers 4.

In the present document, livestock is understood to designate cattle, swine, sheep, goats, poultry, horses, rabbit, etc. The system of the present invention is dimensioned depending on the characteristics, in particular, size and weight, of the livestock to be treated.

Figure 2:
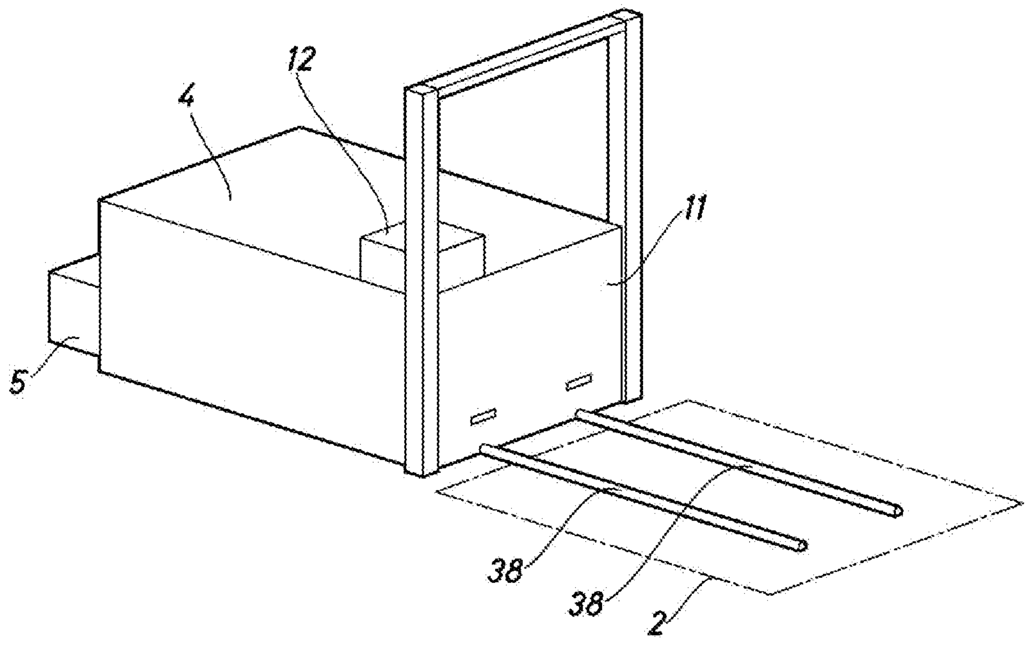
FIG. 2 shows a perspective view of the refrigeration chamber and the container translation unit of the first exemplary embodiment of a dead livestock collection system according to the present invention, wherein the refrigeration chamber has its door closed and the container is housed therein.
Figure 3:
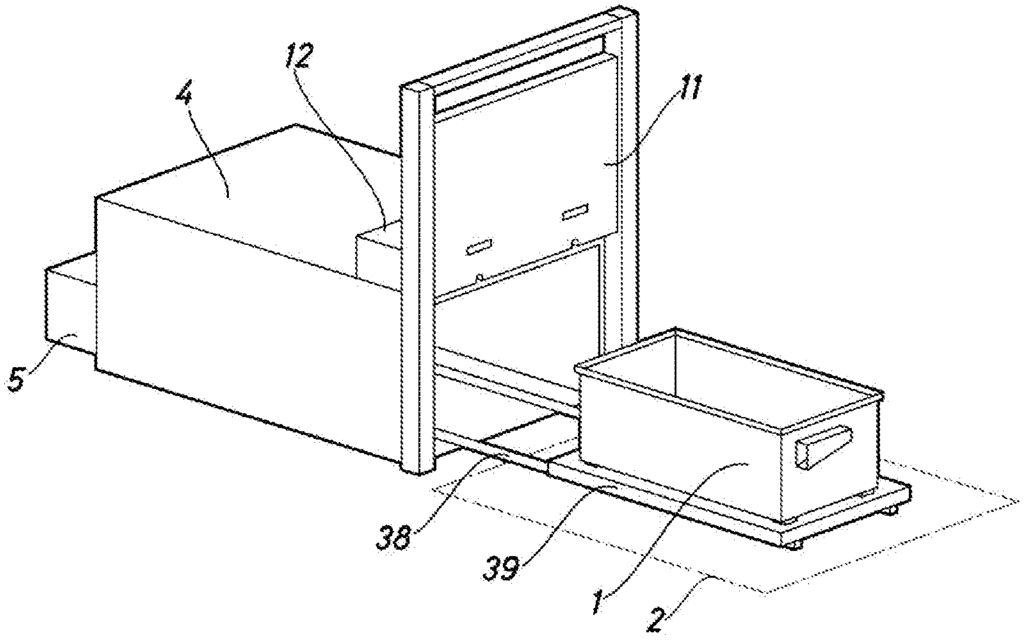
FIG. 3 shows a perspective view of the refrigeration chamber and the container translation unit of FIG. 2, wherein the refrigeration chamber has its door open and the container translation unit have the dead livestock container in the collection site.

FIGS. 2 and 3 show a perspective view of the refrigeration chamber 4 together with its associated container translation unit 13 of the first exemplary embodiment of a system according to the present invention shown in FIG. 1.

As can be seen, in the exemplary embodiment shown the refrigeration chamber 4 comprises a sliding door 11 at one of the ends thereof. However, in other embodiments said door 11 can be of any other type, for example, a swing door, i.e. a hinged door. The system further comprises a door actuation unit 12 arranged to open and close said door 11 of the refrigeration chamber 4. Although in FIGS. 2 and 3 said actuation unit 2 has been depicted on top of the refrigeration chamber 4, in other embodiments, can be placed in any other suitable location.

Attached to the opposite end of the sliding door 11, the refrigeration chamber 4 shown comprises a refrigeration unit 5 configured to maintain the inside of the refrigeration chamber 4 at a temperature on or below a predetermined temperature, which can be, for example, 8 degrees Celsius, so that the carcasses in the container 1 inside said refrigeration chamber 4 do not decay as fast as if they were at ambient temperature. It should be borne in mind that depending on the location and time of the year, for example, under direct sunlight at summer, temperatures can be really high, and thus, carcasses decay very fast. In such circumstances, it could be necessary to collect the carcasses every day. The system of the present invention allows for longer periods between each collection of the dead livestock.

The container translation unit 13 (see FIG. 1) of the exemplary embodiment shown comprises guide elements 38 arranged between the interior of the refrigeration chamber 4 and the collection site 2, a support platform 39 configured to support the container 1, and a translation actuator (not shown), configured to move the support platform 39 along the guide elements 38. Said translation actuator may be, for example, a hydraulic piston, a motor of the support platform, a rack and pinion gear, etc. By moving the support platform 39 along the guide elements 38, the container 1 can be moved from the inside of the refrigeration chamber 4 to the collection site 2, and vice versa.

In order to minimize an increase of temperature of the refrigeration chamber 4 when the door 11 is open when it is needed to move the support platform 39, and in particular, the container 1 to the collection site 2, the system can only open the door and extract the container 1 when the farmer or the collection vehicle 6 are in place and ready to load livestock on the container 1 or unloading the container 1 to the collection vehicle 6, depending on the case. If the loading or unloading operations need to take longer than usual for any reason, it is also possible that the door actuation unit 12 closes the door 11 while the container is at the collection site 12 and opens it again right before the container 1 is ready to be brought back to the inside of the refrigeration chamber 4. Once the container 1 is back in the refrigeration chamber 4 the door 11 closes until the next loading or unloading operation of the container 1.

Moreover, the computing device 25 may also be configured to register and store the time that the door 11 is open, the time that the container 1 is at the collection site 2, temperature drop of the refrigeration chamber 4, temperature increase of the livestock stored in the container 1, etc. The system may also be configured to issue reports of such operating parameters.

Figure 4:
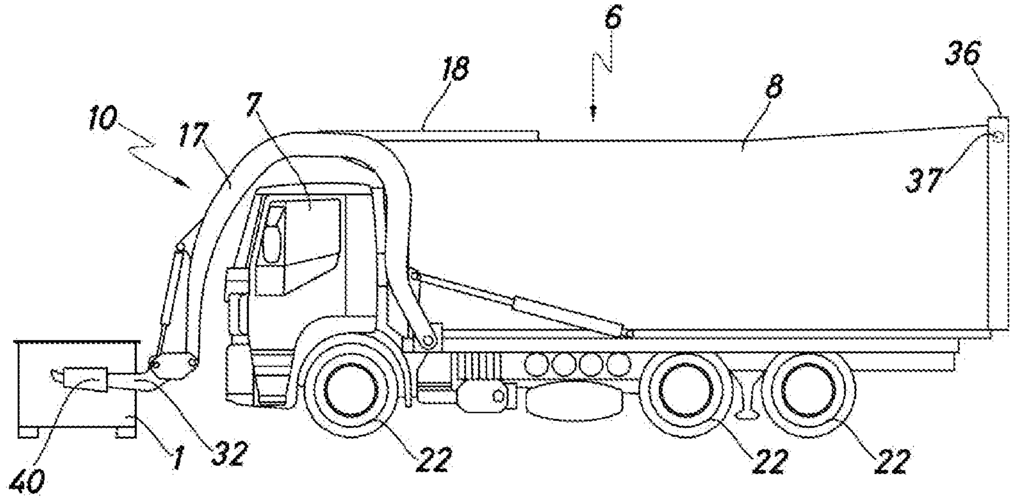
FIG. 4 shows an elevation view of the collection vehicle of the first exemplary embodiment of a dead livestock collection system according to the present invention, wherein the collection vehicle is grasping the dead livestock container at the collection site.
Figure 5:
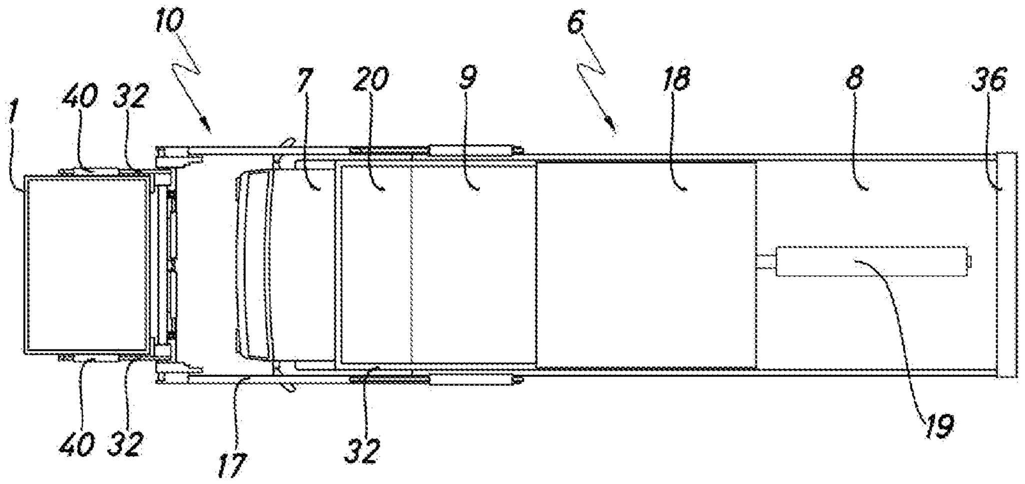
FIG. 5 shows a top view of the collection vehicle of FIG. 4.

FIGS. 4 and 5 show an elevation and a top view, respectively, of the collection vehicle 6 grasping the dead livestock container 1 at the collection site 2 of the first exemplary embodiment of a system according to the present invention. The loading mechanism 10 of the collection vehicle 6 of this first exemplary embodiment of a system according to the present invention comprises a front lifting arm 17 equipped with two opposite forks 32 facing one another and configured to be inserted in corresponding sleeves 40 of the container 1, which in the present case, is a front lift container 1.

Said front lifting arm 17 is operated by the driver of the collection vehicle 6, or any other suitable person, from inside the driver's cab 7 in order to avoid any possible contamination of the operator, thus increasing the health and safety of the worker and avoiding the risk of spreading any contamination that could be present at the collection site 2, or near it, to other livestock farms.

The collection box 8 of the collection vehicle 6 of this exemplary embodiment comprises a top door 18 for opening and closing the top load opening 9 of the collection box 8, that is to say, the sliding top door 18 opens and closes the collection box 8 and is driven by a top door actuator 19, which in this case, is a hydraulic cylinder, although in other embodiments can be a different kind of actuator.

Said top door 18 preferably provides a liquid tight seal of the top load opening 9 when it is in its closed position, so that, for example, rain, does not leak into the collection box 8. In certain embodiments, said top door 18 can also provide a gas tight seal, thus avoiding any leakage to the outside of the vehicle 6 of gases result of the decay of the dead livestock inside the collection box 8.

In the exemplary embodiment shown, the top door 18 is a sliding top door 18. However, in other embodiments said top door 18 can be, for example, a swing door or any other kind of suitable door. In the exemplary embodiment shown, the top door 18 is a single leaf door, although in other embodiments said top door 18 can have two or more leaves.

The collection vehicle 6 shown further comprises a protruding front portion 20 of the collection box 8 and the top loading opening 9 spans a front part of the collection box 8 including the protruding front portion 20. However, in other embodiments the collection box can lack such protruding front portion 20 in which case the top loading opening 9 only spans the top side of the collection box 8. It is also possible that in embodiments wherein the collection box 8 comprises a protruding front portion 20 the top loading opening 9 does not extend to such protruding front portion 20.

The collection vehicle 6 of this exemplary embodiment is a tipper truck, or simply a tipper, that is to say, its collection box 8 is configured to tilt and has a rear discharge door 36 hinged to a horizontal axis 37 for unloading the dead livestock stored in the collection box 8. However, in other embodiments the collection vehicle 6 may not be a tipper truck and the dead livestock inside the collection box 8 may be unloaded in a different manner.

Figure 7:
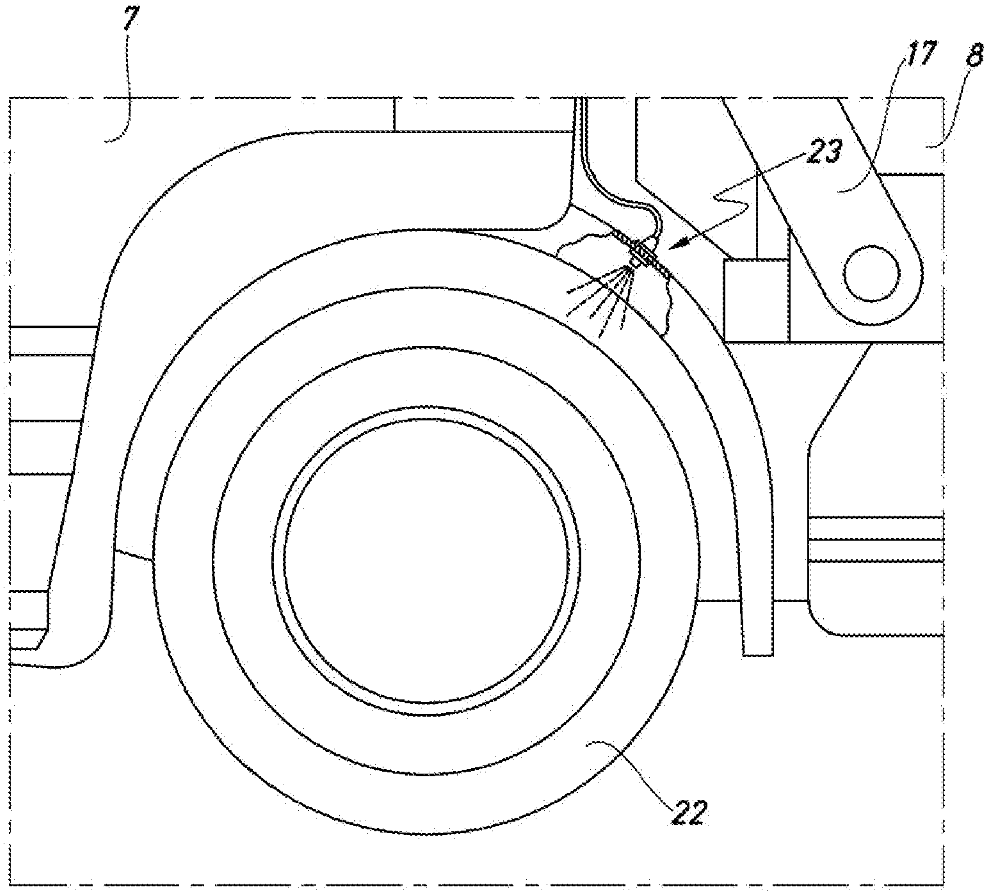
FIG. 7 shows a detail view of a wheel and its disinfection device of the collection vehicle shown in FIGS. 4 to 6.

The collection vehicle 6 of this exemplary embodiment comprises six wheels 22 equipped with a corresponding disinfection device 23 that is described in more detail in the context of FIG. 7. In other embodiments the collection vehicle 6 can have a different number of wheels 22, and even have tracks instead of wheels, for example.

Figure 6:
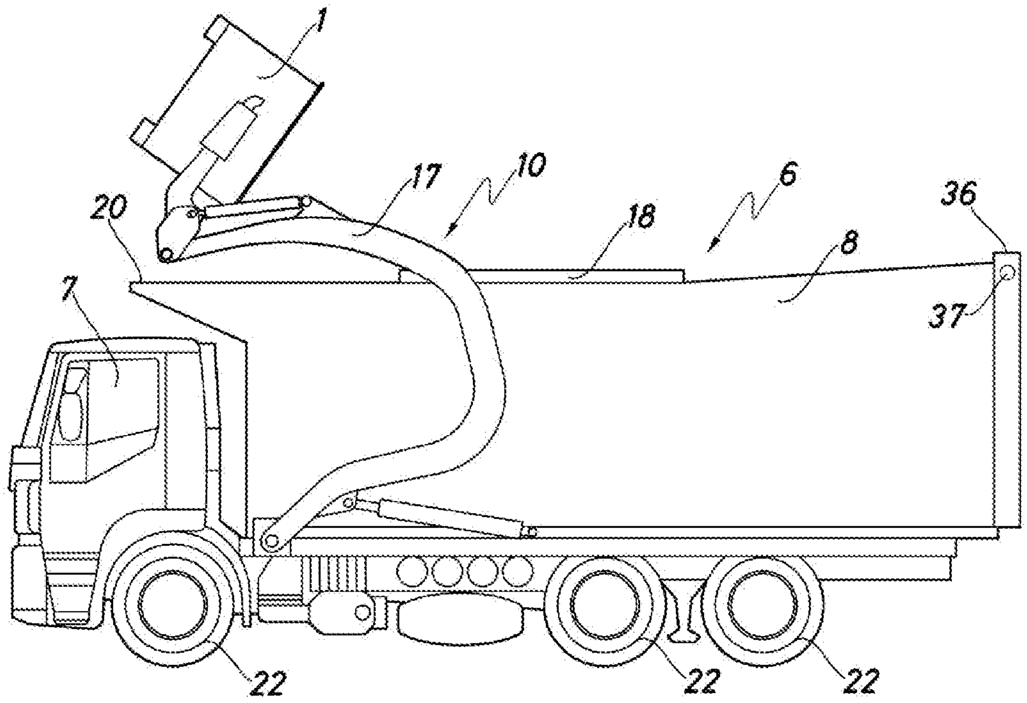
FIG. 6 shows an elevation view of the collection vehicle of FIG. 4, wherein the loading mechanism of the collection vehicle is lifting and tipping the container to unload the dead livestock into the collection box of the collection vehicle.

FIG. 6 shows in an elevation view the collection vehicle 6 of the first exemplary embodiment of a system according to the present invention unloading the dead livestock container 1. As can be seen, in order to unload the container 1 into the collection box 8 of the vehicle 6, the loading mechanism 10 lifts the container 1 and places it above the top load opening 9 so that by tipping the container 1 it unloads the dead livestock stored therein into the collection box 8 of the vehicle 6 through the top loading opening 9, as the dead livestock falls by gravity.

FIG. 7 shows a detail view of a wheel 22 and its corresponding disinfection device 23 of the collection vehicle 6 shown in FIGS. 4 to 6. The collection vehicle 6 comprises a disinfection device 23 for each of its wheels 22 configured to spray a disinfectant liquid on the wheel treads when the collection vehicle starts moving 6 so that the whole circumference of the wheel 22 is sprayed with the disinfectant liquid. The wheels 22 are preferably sprayed once the collection vehicle 6 has returned the container 1 to the collection site 2 after unloading its content into the collection box 8.

Optionally, the spraying of the wheels 22 with disinfectant liquid can be repeated once the collection vehicle has departed the farm facilities and its at a predetermined distance from it, to ensure that while the collection vehicle 6 departed the facility no contamination is spread, even if the wheels 22 were contaminated while the collection vehicle 6 was departing the farm facility after returning the container 1 to the collection site 2.

The disinfection device 23 sprays disinfectant to the wheels 22 at least until the wheel 2 completes a full revolution, although more than one revolution is preferred in order to ensure that the disinfectant liquid has wetted the whole tread of the wheel 22.

Figure 8:
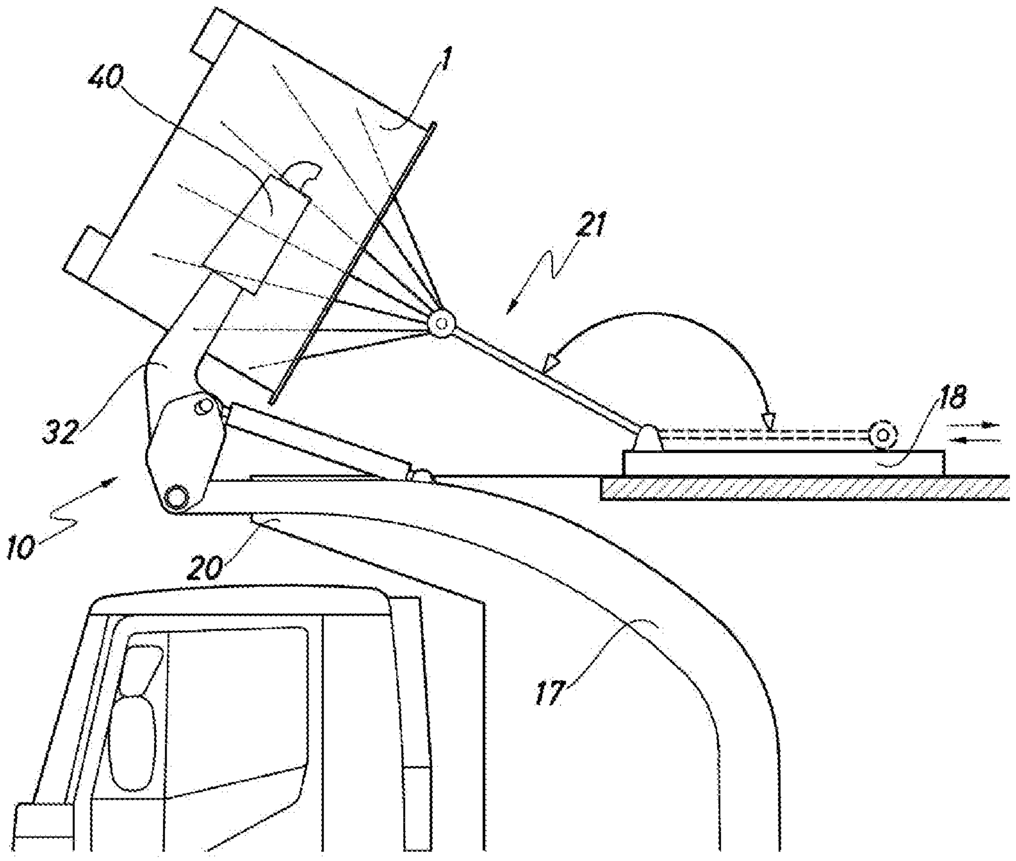
FIG. 8 shows a detail view of a container disinfection device of the collection vehicle shown in FIGS. 4 to 7 disinfecting a dead livestock container.
Figure 9:
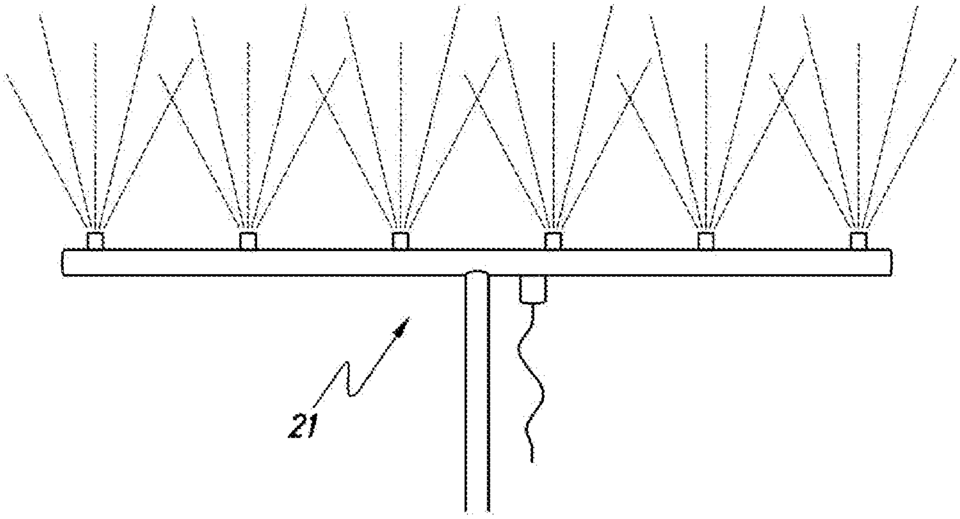
FIG. 9 shows a detail view of the container disinfection device shown in FIG. 8.

FIG. 8 shows a detail view of a container disinfection device 21 of the collection vehicle 6 shown in FIGS. 4 to 7 disinfecting a dead livestock container 1. FIG. 9 shows a view in greater detail view of the container disinfection device 21 shown in FIG. 8.

Once the content of the container 1 has been unloaded into the collection box 8 through the top load opening 9, the loading mechanism 10 maintains the container 1 lifted and tipped, so that a container disinfection device 21 can spray disinfectant into the inside of the container 21 in order to disinfect it and avoid a potential source of contamination.

In the exemplary embodiment shown the disinfection device 21 comprises a foldable arm which comprises a plurality of spray nozzles that spray the disinfectant into the inside of the container. The disinfection 21 device of this exemplary embodiment moves to an operating position when it needs to spray disinfectant into the container and returns to an inoperative position once the spraying operation has ended.

Once the container 1, and in particular its inside, has been sufficiently sprayed with the disinfectant liquid by the disinfecting device 21, the disinfecting device 21 moves to its inoperative position (shown with dotted lines in FIG. 8), and the loading mechanism 10 returns the container 1 to the collection site 2.

Figure 10:
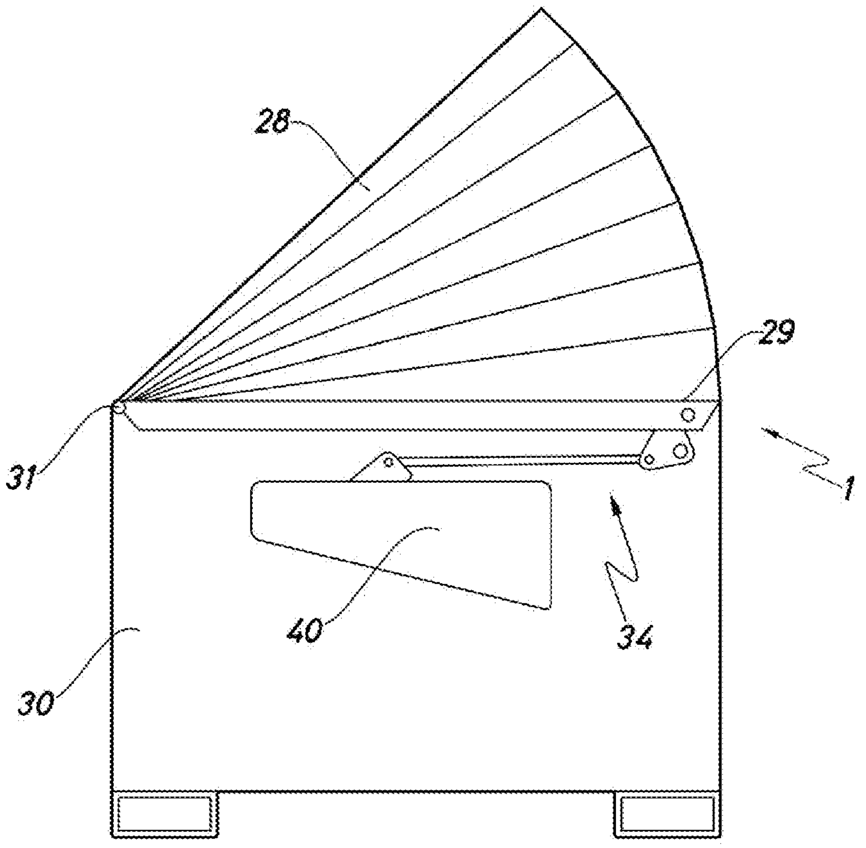
FIG. 10 shows a side view of a dead livestock container of a second exemplary embodiment of a dead livestock collection system according to the present invention with its foldable wall extensions in its unfolded position.
Figure 11:
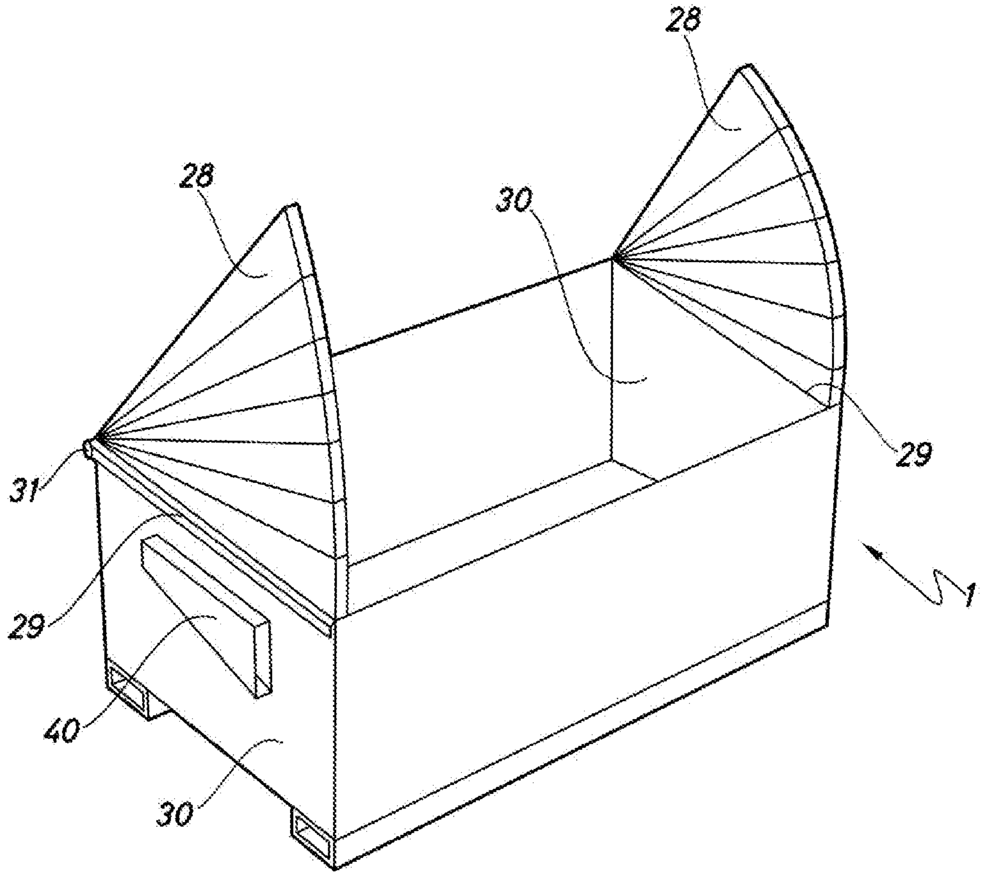
FIG. 11 shows a perspective view of the dead livestock container shown in FIG. 10.

FIGS. 10 and 11 show a side and a perspective view, respectively, of a dead livestock container 1 of a second exemplary embodiment of a dead livestock collection system according to the present invention. The container 1 of this exemplary embodiment comprises foldable wall extensions 28 arranged on top edges 29 of opposite side walls 30 thereof. In this exemplary embodiment, the foldable wall extensions 28 are hinged about an axis at an end of the top edges 29 to move from a folded position to an unfolded position, and vice versa. In the folded position, the foldable wall extensions 28 are hidden and do not protrude from the top edge 29 of the walls 30 of the container, whereas in the unfolded position said foldable wall extensions 28 cover a space between the top edges 29 of the side walls 30 of the container 1 and side edges of the top loading opening 9 of the collection box 8 of the collection vehicle 6 when the container is held by the loading mechanism 10 in a tipped position (see FIG. 12).

The container 1 of this second exemplary embodiment comprises a spring device (not shown) configured to drive the foldable wall extensions 28 to the unfolded position and a retaining mechanism 34 configured to retain the foldable wall extensions 28 in the folded position. Said retaining mechanism 34 is configured to cooperate with the front lifting arm 17, and in particular, with its forks 32, to release the retention mechanism 34 when the front lifting arm 17 grips the container 1 through its sleeves 40. When the retention mechanism 34 is released by the forks 32, the spring device drives the foldable wall extensions 28 from the folded position to the unfolded position.

In order to return the foldable wall extensions 28 to its folded position from its unfolded position, the system of the present invention can comprise a folding mechanism configured to fold the folding wall extensions 28 until they are retained in the folded position by the retaining mechanism. Said folding mechanism is preferably driven by a motor and can be mounted on the container 1 or on the container translation unit 13.

The container 1 of the first exemplary embodiment shown in FIGS. 1 to 9 lacks such foldable wall extensions 28.

The container 1 shown in FIGS. 10 and 11 is a lidless container, that is to say, this container 1 is open on its upper side. As the container is kept inside the refrigeration chamber 4, which is closed, at a temperature on or below a predetermined threshold, it is not necessary that the container 1 is closed. A lidless container 1 eases the loading and unloading operations. However, in other embodiments the container 1 can have a lid that closes it and which is open to load and unload dead livestock to/from it.

Figure 12:
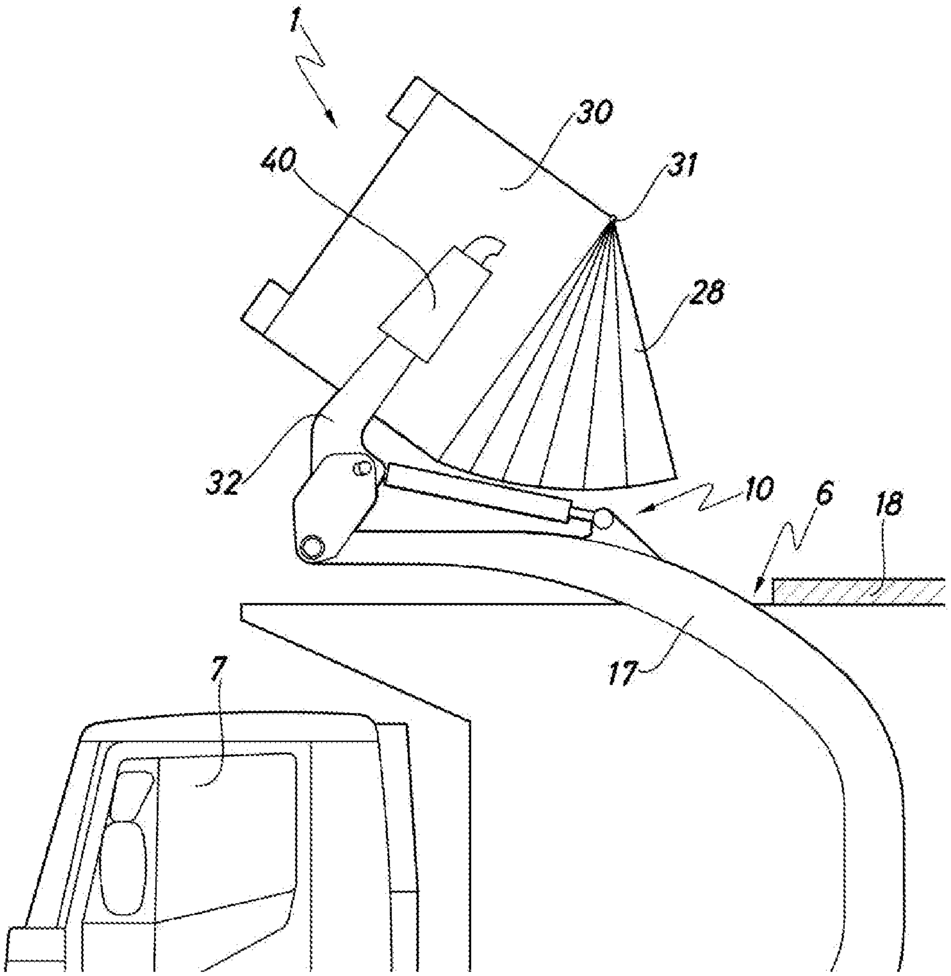
FIG. 12 shows a detail view of the collection vehicle of the second exemplary embodiment of a dead livestock collection system according to the present invention lifting and tipping the dead livestock container shown in FIGS. 10 and 11.

FIG. 12 shows the container 1 of the second exemplary embodiment of a system according to the present invention when it is being emptied into the collection box 8 of the collection vehicle 6.

As explained before, at least, in the context of FIG. 6, in order to empty the container 1 into the collection box 8 of the vehicle 6, the loading mechanism 10 grasps de container 1 at the collection site 2, lifts it until is placed above the top load opening 9 and tips it so that the contents of the container 1, that is to say, the dead livestock, falls by gravity into the collection box 8 by gravity. As a result of the decay of the carcasses inside the container 1, liquid may be present in it. Specially in case of wind at the collection site 2, when the container 1 is emptied, said liquid may be spilled outside the top load opening 9. Spillage of decomposition liquid outside the collection box 8 should be avoided as it poses a risk of contamination. The foldable wall extensions 28 aid to prevent said spillage of liquid, carcasses and/or parts thereof, as it protects it from wind and guides the content of the container 1 to the top load opening 9 of the collection box 8.

What is claimed is:

1. A dead livestock collection system comprising:

a dead livestock container located at a collection site close to a delimiting perimeter of a farm; configured for receiving dead livestock loaded by a farmer;

a refrigeration unit arranged to maintain the container refrigerated;

a collection vehicle having a driver cab and a collection box provided with a top load opening;

a loading mechanism mounted to the collection vehicle and configured to grasp the container at the collection site, lift and tip the container to unload the dead livestock into the collection box of the vehicle through the top load opening, and to return the container to the collection site;

wherein the collection site has an inner access side, through which the container at the collection site is accessible to the farmer from inside the delimiting perimeter or through the delimiting perimeter of the farm for loading dead livestock into the container, and an opposite outer access side through which the container at the collection site is accessible to the collection vehicle from outside the delimiting perimeter of the farm;

and wherein the system further comprises:

a refrigeration chamber dimensioned to enclose the container and provided with a door next to the collection site;

a door actuation unit of the refrigeration chamber arranged to open and close its door;

the refrigeration unit is arranged to maintain the refrigeration chamber at or below a predetermined temperature while its door is closed; and a container translation unit configured to move the container from the refrigeration chamber to the collection site and from the collection site to the refrigeration chamber while the door is open.

2. The system, according to claim 1, wherein it further comprises at least one indoor signal transmitter arranged to be operated from inside the delimiting perimeter of the farm and at least one outdoor signal transmitter arranged to be operated from inside the driver's cab of the collection vehicle, the indoor signal transmitter and the outdoor signal transmitter being configured to emit wireless signals for activating the door actuation unit and the container translation unit.

3. The system, according to claim 1, wherein the loading mechanism of the collection vehicle comprises a front lifting arm, and wherein the container is adapted to be handled with said front lifting arm.

4. The system, according to claim 3, wherein the collection box of the collection vehicle has a container disinfection device configured to spray a disinfectant liquid inside the container while the container is held by the front lifting arm in a tipping position after it has been unloaded into the collection box of the collection vehicle and before it is returned to the collection site.

5. The system, according to claim 3, wherein the container has foldable wall extensions arranged on top edges of opposite side walls thereof, the foldable wall extensions being hinged about an axis at an end of the top edges of the opposite side walls of the container to move between a folded position and an unfolded position, said foldable wall extensions being configured to cover, in the unfolded position, lateral spaces between the top edges of the side walls of the container and side edges of the top loading opening of the collection box of the collection vehicle when the container is held by the front lifting arm in a tipped position.

6. The system, according to claim 5, wherein the container has a spring device configured to drive the foldable wall extensions to the unfolded position and a retaining mechanism configured to retain the foldable wall extensions in the folded position, said retaining mechanism being configured to cooperate with the front lifting arm of the collection vehicle to release retention of the foldable wall extensions when the front lift arm grips the container.

7. The system, according to claim 5, wherein it further comprises a motorised folding mechanism mounted on the container or on the container translation unit, said motorised folding mechanism being configured to fold the folding wall extensions against a force exerted by the spring device until the folding wall extensions are retained in the folded position by the retaining mechanism.

8. The system, according to claim 1, wherein the collection vehicle comprises a loading control located within the driver's cab, said loading control being configured to control the loading mechanism of the collection vehicle.

9. The system, according to claim 8, wherein the top loading opening of the collection box of the collection vehicle has a top door and a top door actuator arranged to move the top door between an open position and a closed position, and wherein the loading control is configured to activate the top door actuator in coordination with the loading mechanism.

10. The system, according to claim 1, wherein the collection box of the collection vehicle has a protruding front portion extending over a part of the driver's cab, and the top loading opening spans a front part of the collection box including the protruding front portion.

11. The system, according to claim 1, wherein the collection vehicle comprises wheels, said wheels having wheel treads, and a wheel disinfection device configured to spray a disinfectant liquid on the wheel treads while the collection vehicle starts moving after the container has been returned to the collection site.

12. The system, according to claim 1, wherein the refrigeration chamber is equipped with a plurality of sensors and wherein the system further comprises a computing device configured to determine, in cooperation with the plurality of sensors, when the dead livestock of the container needs to be collected.

13. The system, according to claim 12, wherein it further comprises a signal emitter connected to the computing device and configured to automatically send a collection message to a collection control station in charge of programming collection routes of the collection vehicle when the computing device has determined a collection need.

14. The system, according to claim 1, wherein the container translation unit comprises guide elements arranged from inside the refrigeration chamber to the collection site, a support platform configured to support the container, and a translation actuator configured to move the support platform along the guide elements.

15. The system, according to claim 1, wherein the collection box of the collection vehicle is configured to tilt and has a rear discharge door hinged to a horizontal axis.

* * * * *